(12) United States Patent
Rittenhouse (10) Patent No.: US 10,682,749 B2
(45) Date of Patent: Jun. 16, 2020

(54) COMBINATION SHEET METAL HAMMER AND DUET STRETCHER DEVICE

(71) Applicant: Mike Rittenhouse, Anderson, IN (US)

(72) Inventor: Mike Rittenhouse, Anderson, IN (US)

( * ) Notice: Subject to any disclaimer, the term of this patent is extended or adjusted under 35 U.S.C. 154(b) by 95 days.

(21) Appl. No.: 15/959,315

(22) Filed: Apr. 23, 2018

(65) Prior Publication Data

US 2018/0304452 A1 Oct. 25, 2018

Related U.S. Application Data

(60) Provisional application No. 62/488,894, filed on Apr. 24, 2017.

(51) Int. Cl.

| | | |
|---|---|---|
| *B25F 1/00* | (2006.01) | |
| *B21D 39/02* | (2006.01) | |
| *F24F 13/02* | (2006.01) | |
| *B25B 27/16* | (2006.01) | |
| *B25G 3/00* | (2006.01) | |
| *F16L 23/14* | (2006.01) | |
| *F16L 23/024* | (2006.01) | |

(52) U.S. Cl.
CPC ............ *B25F 1/006* (2013.01); *B21D 39/025* (2013.01); *B25B 27/16* (2013.01); *B25G 3/00* (2013.01); *F24F 13/0209* (2013.01); *F16L 23/024* (2013.01); *F16L 23/14* (2013.01); *F24F 13/02* (2013.01)

(58) Field of Classification Search
CPC ... B25F 1/006; B25F 1/00; B25F 1/04; B21D 39/025; B25B 27/16; B25G 3/00; F24F 13/0209; F24F 13/02; F16L 23/024; F16L 23/14; B25D 1/02; B25D 1/00; B66F 15/00

See application file for complete search history.

(56) References Cited

U.S. PATENT DOCUMENTS

| | | | | |
|---|---|---|---|---|
| 4,398,334 | A | * | 8/1983 | Kovalevich ............ B21D 39/02 29/243.5 |
| 4,447,079 | A | | 5/1984 | Sullivan |
| 5,090,101 | A | | 2/1992 | Wilty |
| 5,660,069 | A | | 8/1997 | Williams |
| 7,878,491 | B2 | | 2/2011 | Li et al. |
| 8,678,450 | B2 | | 3/2014 | Seraphonoff |
| 9,656,379 | B2 | * | 5/2017 | Doster, Jr. ................ B25F 1/006 |
| 2006/0144195 | A1 | * | 7/2006 | Tanga ...................... B25D 1/00 81/20 |
| 2007/0124867 | A1 | | 6/2007 | Wood et al. |
| 2007/0234543 | A1 | * | 10/2007 | Aeschliman .............. B25B 7/02 29/243.5 |
| 2010/0024605 | A1 | * | 2/2010 | Hiltz ................... B62D 53/0857 81/20 |
| 2012/0098282 | A1 | * | 4/2012 | Langan ................... B25F 1/006 294/49 |

* cited by examiner

*Primary Examiner* — Robert J Scruggs
(74) *Attorney, Agent, or Firm* — Ritchison Law Offices, PC; John D Ritchison (57) ABSTRACT

A combination sheet metal hammer and duct stretcher device. The device is directed to the field of heating, ventilation and air conditioning and particularly to a duct assembly tool for drawing and pinching two pieces of duct work together.

9 Claims, 11 Drawing Sheets

COMBINATION SHEET METAL HAMMER AND DUET STRETCHER DEVICE

CROSS-REFERENCE TO RELATED APPLICATIONS

This application claims the benefit of United States Provisional Patent Application with Ser. No. 62/488,894 filed Apr. 24, 2017, by Mike Rittenhouse and entitled "Combination Sheet Metal Hammer and Duct Stretcher Device".

FIELD OF INVENTION

This invention relates to a combination sheet metal hammer and duct stretcher device. The present invention is directed to the field of heating, ventilation and air conditioning and particularly to a duct assembly tool for drawing and pinching two pieces of duct work together. Therefore this relates to an apparatus for joining adjacent ducts and to a duct assembly tool for drawing and clamping two pieces of duct work together. The device is a means and apparatus for connecting together sheet metal ducts in end-to-end relationship, for use with medium and high pressure and larger low pressure fluid flow systems. The present invention is a hand tool for installing cleats over seams and driving the cleat over abutting edges of ducts.

FEDERALLY SPONSORED RESEARCH

None.

SEQUENCE LISTING OR PROGRAM

None.

BACKGROUND—FIELD OF INVENTION AND PRIOR ART

A novelty search revealed that, as far as known, there are no combination sheet metal hammer and duct stretcher devices or the like. It is believed that this product is unique in its design and technologies.

BACKGROUND

This background as to sheet metal tools and processes should be useful. Generally in the heating and cooling field, ductwork is used to convey heated and cooled air. The ductwork is normally hung from the building's ceiling or rafters. Generally, the ducts have a circular or rectangular shape, are fabricated from sheet metal material, and range in length from eight to twelve feet long. Particularly in rectangular shaped ductwork, the ducts have assembly seams or flanges on each end to enable a cleat to be positioned over the flanges to secure the ducts to one another. When duct work is hung overhead, a gap is created between two adjacent ducts necessitating drawing the ducts together in order that a cleat may be positioned over the flanges to secure the ducts together. Different types of tools are used to draw duct assembly flanges together in order to enable a cleat to be positioned onto the adjacent duct flanges. Currently available tools for securing ductwork and the like together vary in their design and methods and are often referred to as "duct pullers" or "duct stretchers". Methods utilized by these tools include pulling or stretching ductwork with a rigid or offset bar with attached gripper wheels or by utilizing a clamping or squeezing device similar to a pair of pliers or other vise-grips. These tools have several disadvantages. One disadvantage is that the present tools can be heavy and are often quite large, in some cases upwards of 21 inches long, making them not easily accessible, as they typically can't be carried in a tool pouch. Rather they are generally stored in a toolbox or a work vehicle making them less than convenient when not carried with other everyday heating, ventilation and air conditioning ("HVAC") tools within the tool pouch. Another disadvantage is they are often rigid and require exertion of large amounts of force to draw adjacent duct flanges together to enable a cleat to be positioned over the flanges. Still another disadvantage is their cost. Many of these tools range in price from twenty-four dollars to upwards of forty-five dollars. Yet another disadvantage is the limits these tools have in closely spaced ductwork environments. Those tools that utilize the pulling, stretching, or clamping methods are generally not well-suited for working with closely spaced ductwork because the design and size can often limit accessibility, especially when drawing ductwork run closely parallel to each other. The present invention solves these problems by providing a unique, combination heating and cooling ductwork assembly tool.

Problem Solved

The improvement and problem solved as to the combination sheet metal hammer and duct stretcher device is a fast, secure, and precise way to tighten the duct seam with the duct stretcher wheel, place the cleat over the seam, then drive the cleat onto the seam with the hammer portion of the combination tool. It saves switching tools while up on a ladder and is one less tool to carry in the tool belt. Switching a hand tool can be cumbersome and a misbalance can cause a fall. The ability to have the combination tool relieves these concerns.

PRIOR ART

As far as known, there are no Combination Sheet Metal Hammer and Duct Stretcher Devices or the like. A diligent novelty search was completed. The following was revealed:

A. U.S. Pat. No. 8,678,450 issued to Seraphinoff in 2014 and called a Rail drive duct connection system. It teaches an apparatus for joining high pressure ducts that has a first and second bar secured to adjacent to be joined ducts. A coupling mechanism having a U-shape is frictionally engaged onto the first and second bar. An end of the coupling mechanism frictionally engages the surface of the bar members so that the coupling mechanism is slidably removably connected to the first and second bars.

B. A U.S. Pat. No. 7,878,491 was issued to Li et. al in 2011 for a clamp with driving unit. It demonstrated and claimed an exemplary clamp that includes a holder, a moving unit, a fixing arm, and a driving unit. The moving unit includes a push block, a connecting member, and a guiding member. The guiding member is fixed on the holder. The connecting member connects the push block and the guiding member. The push block includes a slanted side surface. The push block is guided to move by the guiding member. The slanted side surface of the push block interacts with the connecting member. The fixing arm is fixed to the connecting member. The driving unit is connected to the push block. The driving unit is capable of moving the push block of the moving unit.

C. US Patent application 2007/0124867 was submitted by Woods et. al in 2007 for a duct assembly tool that showed a combination tool for the assembly of sheet metal ductwork. The tool provided a cleat engaging aperture for closing the gap between adjoining ductwork. The tool also includes a jaw for engaging the edges of sheet metal pieces for creating a fold and for creating a continuous seam. The tool also includes a measurement ruler, scribe holes and leveling bubbles for the assembly of ductwork.

D. U.S. Pat. No. 5,660,069 issued to Williams in 1997 for a device called a hands free assembly tool. This demonstrated a duct assembly tool that provided with "vise grip" type handles to allow the tool to be completely released while it assembles sections of duct. Duct assembly flanges are closed together by gripping members which are rotatable with respect to the tool handles. The gripping members may be disc shaped to allow the tool to be used to straighten bowed duct walls.

E. Next, U.S. Pat. No. 5,090,101 issued in 1992 to Welty for a duct corner installation tool shows a hand-held power tool for installing the corners of transverse duct systems. The tool has powered jaws that, when placed over a standard corner piece and one of the flanges of the duct, will first clamp the corner piece in place on the flange and then crimp the flange over the corner piece to complete the installation. Both operations of clamping and crimping are accomplished with a single stroke of the operating rod of an air cylinder.

F. U.S. Pat. No. 4,447,079 was issued to Sullivan in 1984 for a duct joining system. This is a duct jointing system which has frame members each with a channel portion for engaging an end of a respective duct wall and an outwardly projecting portion. L-shaped connectors engage in openings in the outwardly projecting portions for securing the frame members together as frames and adjacent frames are connected by cleats engaging projections on the outwardly projecting portions and reinforcing flanges on the connectors, the flanges being cut-away to allow the cleats to be driven longitudinally into position.

G. A U.S. Pat. No. 4,398,334 for a duct work clip installer and crimper was issued to Kovalevich in 1983. This is a hand tool for installing clips to abutting edges of ducts and for crimping the clips used to secure the ducts together and comprised of a rectangularly shaped base plate including pairs of opposed rollers mounted thereon with their axes perpendicular to the plate. A gap between the rollers is approximately the same size as the width of the combined edges being secured together. A raised pusher member pushes a clip which is resting on the plate into place and the same is crimped by the rollers when the tool is drawn back. A handle is located on the reverse side of the plate for manually moving the tool.

None of this art anticipated the Rittenhouse innovation nor renders the new, efficient tool as obvious to one skilled in the art of sheet metal fabrication and assembly.

SUMMARY OF THE INVENTION

This invention is a combination sheet metal hammer and duct stretcher device for various applications. The preferred embodiment of a combination sheet metal hammer and duct stretcher device is comprised of: (a) a sheet metal hammer head further comprised of a punch/impact/mallet flat end, a pry/lift angled chisel end, and a means for connecting the head to a handle; (b) the handle further comprised of a top shank; an extension and grip, a threaded aperture for the means to connect with the handle, and a means such as a connecting bolt for removably connecting a wheel to the shank; and (c) a duct stretcher further comprised of the wheel, an aperture for the means such as a connecting bolt to attach the wheel to the shank wherein the combination sheet metal hammer and duct stretcher device can be used for sheet metal hammer work and duct stretcher work on new or repaired overhead installation of sheet metal duct devices—registers, diverters, turns, drops as well as heating, cooling, dust, and moisture apparatuses—equally without using another sheet metal tool.

The newly invented combination sheet metal hammer and duct stretcher device for various applications may be manufactured at low volumes by very simple means and in high volume production by more complex and controlled systems.

OBJECTS AND ADVANTAGES

There are several objects and advantages of the combination sheet metal hammer and duct stretcher device. There are currently no known sheet metal tool that are effective at providing the objects of this invention. The combination sheet metal hammer and duct stretcher device has various advantages and benefits:

| Item | Advantages |
| --- | --- |
| 1 | Frees up hand for work |
| 2 | Provides less bending and reaching for second tool thus improves balance |
| 3 | Allows one less tool on ladder |
| 4 | Allows one less tool in tool caddy/belt/box |
| 5 | Is a combination tool that is less cost than two (2) separate tools |
| 6 | Is left or right hand adaptable |
| 7 | Is made and assembled with conventional manufacturing process |

Finally, other advantages and additional features of the present combination sheet metal hammer and duct stretcher device will be more apparent from the accompanying drawings and from the full description of the device. For one skilled in the art of sheet metal and metal working devices and systems, it is readily understood that the features shown in the examples with this product are readily adapted to other types of sheet metal combination tool devices.

DESCRIPTION OF THE DRAWINGS—FIGURES

The accompanying drawings, which are incorporated in and constitute a part of this specification, illustrate an embodiment of the combination sheet metal hammer and duct stretcher device for various applications device that is preferred. The drawings together with the summary description given above and a detailed description given below serve to explain the principles of the combination sheet metal tool. It is understood, however, that the combination sheet metal tool is not limited to only the precise arrangements and instrumentalities shown.

FIGS. 1 A through 1 C are sketches of the general combination sheet metal hammer and duct stretcher device.

FIGS. 2 A through 2 G are sketches of the general combination sheet metal hammer and duct stretcher device with specific components and features noted.

FIGS. 3 A through 3 D are sketches of a prototype.

FIGS. 4 A through 4 G are sketches are more sketches of a prototype with components and features note.

FIGS. 6 A through 6 D are sketches of installing duct work and using the combination sheet metal hammer and duct stretcher.

FIGS. 7 A through 7 C are sketches of installing duct work and using the combination sheet metal hammer and duct stretcher.

FIGS. 8 A through 8 H are sketches of various conventional sheet metal duct stretchers.

FIGS. 9 A through 9 E are sketches of sheet metal seams, cleats, and seam tools.

FIGS. 10 A and 10 B are sketches of prior art sheet metal duct tools.

FIGS. 11 A and 11 B are more sketches of prior art sheet metal duct tools.

REFERENCE NUMERALS

The following list refers to the drawings:

TABLE B

| Ref # | Description |
|---|---|
| 30 | combination sheet metal hammer and duct stretcher device 30 |
| 32 | prototype 32 of combination sheet metal hammer and duct stretcher device 30 |
| 33 | drawings 33 of combination sheet metal hammer and duct stretcher device 30 |
| 40 | sheet metal hammer head 40 of combination sheet metal hammer and duct stretcher device 30 |
| 41 | punch/impact/mallet flat end 41 with a full-polished and beveled face and corrosion resistant. The metal portions can be individually hardened and tempered for strength and resiliency. |
| 42 | pry/lift angled chisel end 42 |
| 43 | means 43 for securing/connecting head 40 to handle 50 - like a threaded aperture and threaded bolt, rivet, cotter pin and key, epoxy, brazing, and soldering |
| 44 | threaded bolt 44 for connecting head 40 to handle 50 |
| 45 | flat 45 contiguous to handle 50 at flat 53 |
| 46 | threaded aperture 46 for connecting bolt 63 to removably secure the wheel 60 at aperture 62 |
| 50 | handle 50 of combination sheet metal hammer and duct stretcher device 30 |
| 51 | top shank 51 |
| 52 | extension and grip 52 |
| 52T | top section 52T of a two piece extension and grip |
| 52B | bottom section 52B of a two piece extension and grip |
| 52S | means 52S for securing/connecting top section 52T to bottom section 52B - like a threaded aperture and threaded bolt, rivet, cotter pin and key, epoxy, brazing, and soldering |
| 53 | flat 53 contiguous to head 40 at flat 45 |
| 54 | threaded aperture 54 for connecting bolt 44 to top shank 51 |
| 55 | threaded aperture 55 in handle 50 to connect to wheel 60 at bolt 63 |
| 56 | flat 56 of grip 52 |
| 57 | hollowed flat 57 of grip 52 to lighten device 30 |
| 58 | recess apertures 58 |
| 59 | grip 59 synthetic or natural rubber, neoprene, urethane, or the like |
| 60 | duct stretcher 60 |
| 61 | wheel 61 |

TABLE B-continued

| Ref # | Description |
|---|---|
| 62 | aperture 62 for a means 63 such as a connecting bolt to shank 51 |
| 63 | a means 63 such as a connecting bolt for removably connecting a wheel 51 to the shank 51 |
| 70 | duct work 70 |
| 71 | sheet metal skilled installer 71 |
| 72 | seam 72 |
| 72A | corner seam 72A |
| 73 | duct hanger 73 |
| 74 | cleat 74 |
| 74A | corner cleat 74A |
| 80 | using 80 combination sheet metal hammer and duct stretcher device 30, 32 in field installing sheet metal duct 70 |
| 81 | duct stretcher 81 |
| 82 | offset duct stretcher 82 |
| 85 | locking "three" (3) wheeled duct stretcher 85 |
| 90 | prior art U.S. patent application 2007/0124867 duct assembly tool 90 |
| 91 | prior art U.S. Pat. No. 8,678,450 rail drive duct connector 91 |
| 92 | prior art U.S. Pat. No. 4,398,334 duct work clip installer and crimper 92 |
| 93 | prior art U.S. Pat. No. 5,660,069 hands free assembly tool 93 |
| 94 | prior art U.S. Pat. No. 4,497,079 duct joining system 94 |
| 99 | sheet metal hammer 99 |

DETAILED DESCRIPTION OF PREFERRED EMBODIMENT

This invention relates to a combination sheet metal hammer and duct stretcher device. The present invention is directed to the field of heating, ventilation and air conditioning and particularly to a duct assembly tool for drawing and pinching two pieces of duct work together. Therefore this relates to an apparatus for joining adjacent ducts and to a duct assembly tool for drawing and clamping two pieces of duct work together. The device is a means and apparatus for connecting together sheet metal ducts in end-to-end relationship, for use with medium and high pressure and larger low pressure fluid flow systems. The present invention is a hand tool for installing cleats over seams and driving the cleat over abutting edges of ducts.

The advantages for the combination sheet metal hammer and duct stretcher device 30 are listed above in the introduction. Succinctly the benefits are that the device:

A. Frees up hand for work;
B. Provides less bending and reaching for second tool thus improves balance;
C. Allows one less tool on ladder;
D. Allows one less tool in tool caddy/belt/box;
E. Is a combination tool that is less cost than two (2) separate tools;
F. Is left or right hand adaptable; and
G. Is made and assembled with conventional manufacturing process The preferred embodiment of a combination sheet metal hammer and duct stretcher device is comprised of: (a) a sheet metal hammer head 40 further comprised of a punch/impact/mallet flat end 41, a pry/lift angled chisel end 42, and a means 43,44 for connecting the head 40 to a handle 50; (b) the handle 50 further comprised of a top shank 51; an extension and grip 52, a threaded aperture for the means 43,44 to connect with the handle 50, and a means 63 such as a connecting bolt for removably connecting a wheel 61 to the shank 51; and (c) a duct stretcher 60 further comprised of the wheel 61, an aperture 62 for the means 63 such as a connecting bolt to attach the wheel 61 to the shank 51 wherein the combination sheet metal hammer and duct stretcher device can be used for sheet metal hammer work and duct stretcher work on new or repaired overhead installation of sheet metal duct devices—registers, diverters, turns, drops as well as heating, cooling, dust, and moisture apparatuses—equally without using another sheet metal tool.

Figure 4:
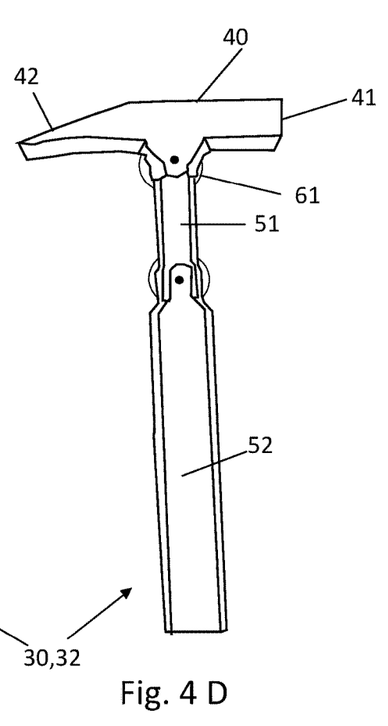
Figure 5:
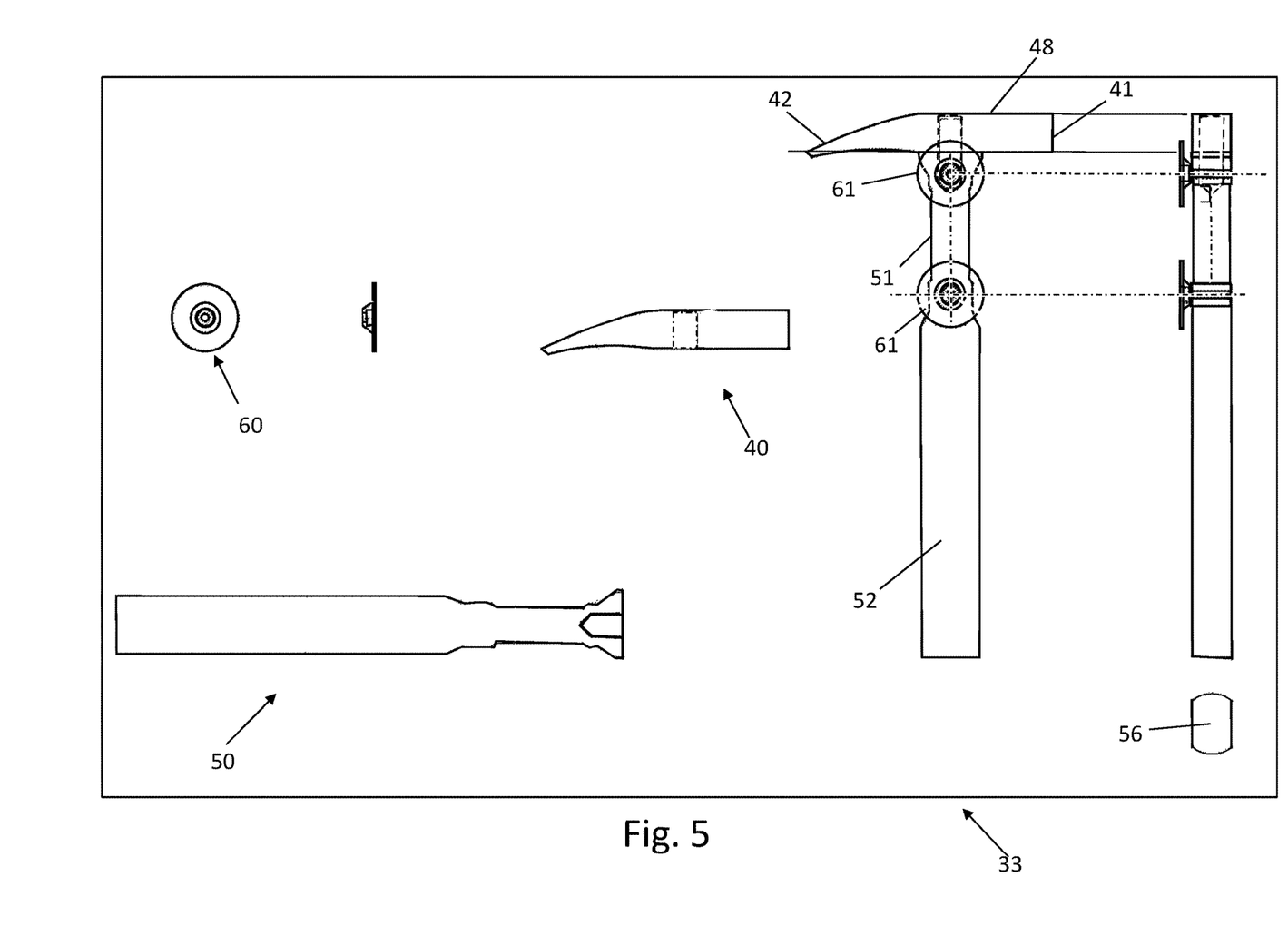
FIG. 5 is a sketch of the drawing of a combination sheet metal hammer and duct stretcher.
Figure 6:
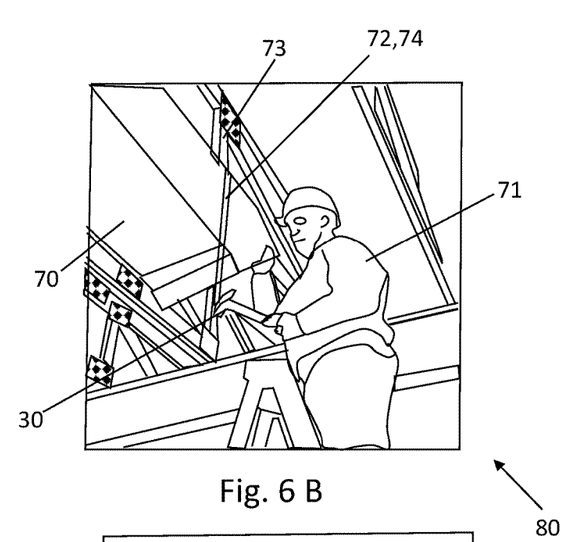
Figure 7:
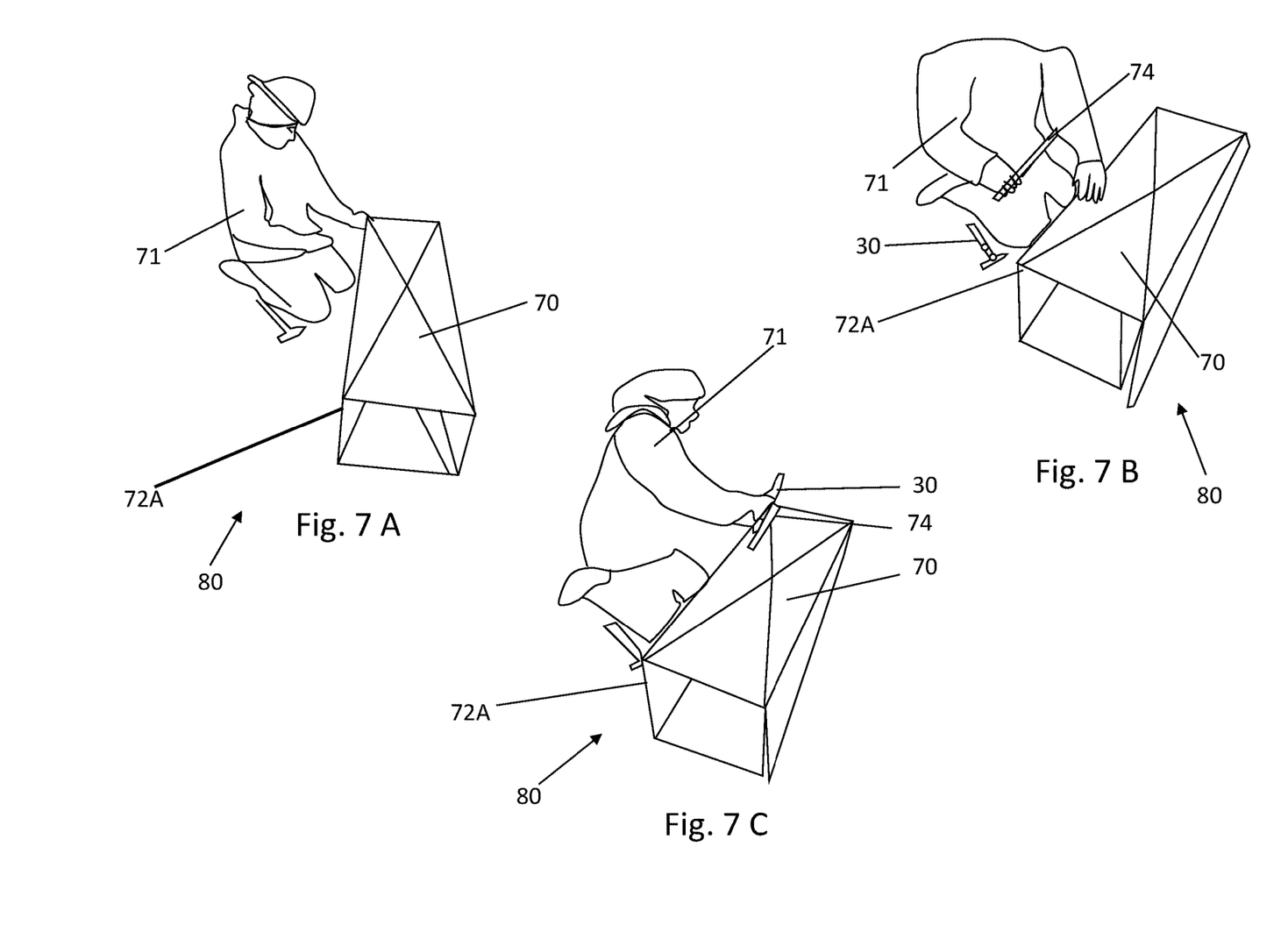

There is shown in FIGS. 1-11 a complete description and operative embodiment of the combination sheet metal tool. In the drawings and illustrations, one notes well that the FIGS. 1 through 5 demonstrate the general configuration and use of this product. The various example uses in FIGS. 6 and 7 are discussed in the operation and use section, below. FIGS. 8 through 11 show Prior Art.

The accompanying drawings, which are incorporated in and constitute a part of this specification, illustrate an embodiment of the combination sheet metal hammer and duct stretcher device 30 that is preferred. The drawings together with the summary description given above and a detailed description given below serve to explain the principles of the combination sheet metal tool 30. It is understood, however, that the sheet metal tool device 30 is not limited to only the precise arrangements and instrumentalities shown. Other examples of sheet metal tools and combinations thereof as devices and uses are still understood by one skilled in the art of sheet metal and metal working devices and systems to be well within the scope and spirit shown here.

Figure 1:
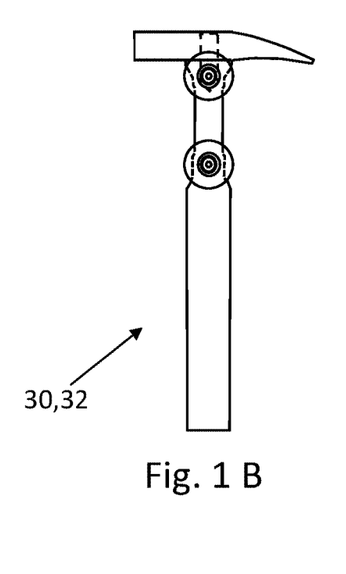

FIGS. 1 A through 1 C are sketches of the general combination sheet metal hammer and duct stretcher device 30. Shown in these sketches are: a combination sheet metal hammer and duct stretcher device 30, a prototype 32 of combination sheet metal hammer and duct stretcher device 30, a drawing 33 of the combination sheet metal hammer and duct stretcher device 30, and an installer using 80 combination sheet metal hammer and duct stretcher device 30, 32 in field installing sheet metal duct 70.

Figure 2:
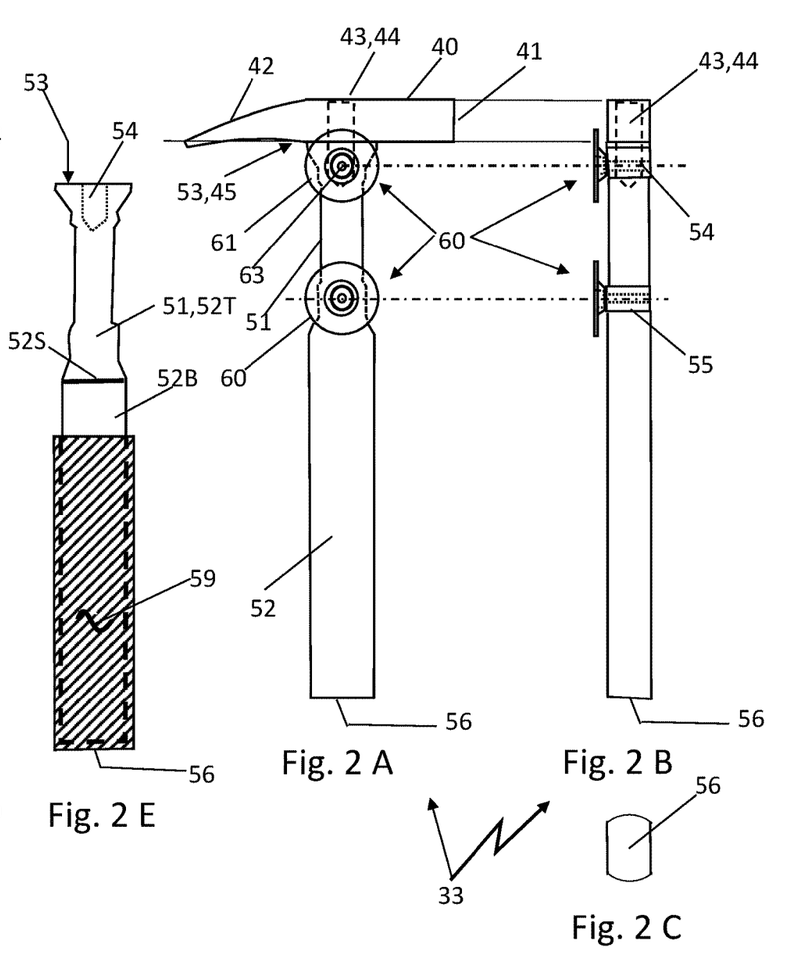

FIGS. 2 A through 2 G are sketches of the general combination sheet metal hammer and duct stretcher device 30 with specific components and features noted. These drawing views demonstrate a drawing 33 of the combination sheet metal hammer and duct stretcher device 30, a sheet metal hammer head 40 of combination sheet metal hammer and duct stretcher device 30, a punch/impact/mallet flat end 41 with a full-polished and beveled face and corrosion resistant (the metal portions can be individually hardened and tempered for strength and resiliency), a pry/lift angled chisel end 42, a threaded aperture for connecting head 40 to handle 50, a means 43 for securing/connecting head 40 to handle 50—like a threaded aperture and threaded bolt, rivet, cotter pin and key, epoxy, brazing, and soldering, a threaded means 44 for connecting head 40 to handle 50, a flat 45 contiguous to a handle 50 at the flat 53, a handle 50 of combination sheet metal hammer and duct a stretcher device 30, a top shank 51, an extension and grip 52, a flat 53 contiguous to head 40 at the flat 45, a threaded aperture 54 for connecting bolt, threaded means 44 to top shank 51, a threaded aperture 55 in handle 50 to connect to wheel 60 at a bolt 63, a flat 56 of grip 52, a grip 59 made of a resilient yet durable material such as synthetic or natural rubber, neoprene, urethane, or the like, a duct stretcher 60, a wheel 61, an aperture 62 for a means 63 such as a connecting bolt to shank 51, and a means 63 such as a connecting bolt for removably connecting a wheel 51 to the shank 51.

Figure 3:
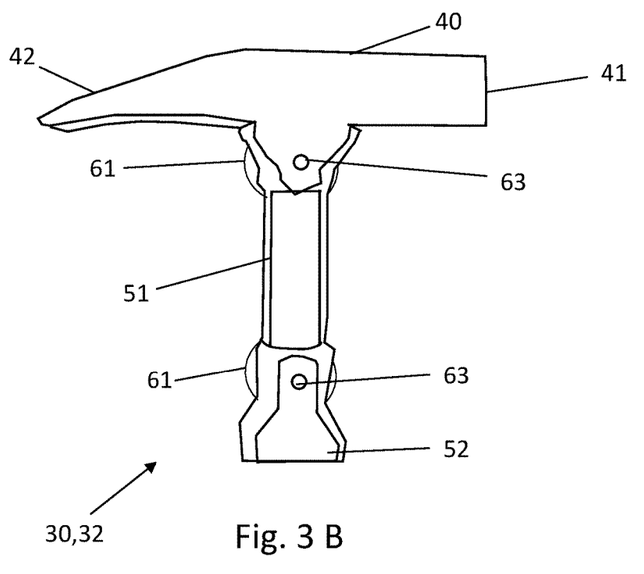

FIGS. 3 A through 3 D are sketches of a prototype 32. Drawings provided here depict a combination sheet metal hammer and duct stretcher device 30, a prototype 32 of combination sheet metal hammer and duct stretcher device 30, a sheet metal hammer head 40 of combination sheet metal hammer and duct stretcher device 30, a punch/impact/mallet flat end 41 with a full-polished and beveled face and corrosion resistant (the metal portions can be individually hardened and tempered for strength and resiliency), a pry/lift angled chisel end 42, a top shank 51, an extension and grip 52, a flat 56 of grip 52, a hollowed flat 57 of grip 52 to lighten device 30, a recess apertures 58, a wheel 61, and a means 63 such as a connecting bolt for removably connecting a wheel 51 to the shank 51.

FIGS. 4 A through 4 G are sketches are more sketches of a prototype 32 with components and features noted. These views again show: a combination sheet metal hammer and duct stretcher device 30, a prototype 32 of combination sheet metal hammer and duct stretcher device 30, a sheet metal hammer head 40 of combination sheet metal hammer and duct stretcher device 30, a punch/impact/mallet flat end 41 with a full-polished and beveled face and corrosion resistant (the metal portions can be individually hardened and tempered for strength and resiliency), a pry/lift angled chisel end 42, a top shank 51, an extension and grip 52, a flat 56 of grip 52, a hollowed flat 57 of grip 52 to lighten device 30, a recess apertures 58, a wheel 61, and a means 63 such as a connecting bolt for removably connecting a wheel 51 to the shank 51.

FIG. 5 is a drawing 33 of a combination sheet metal hammer and duct stretcher 30. This drawing details the manner to build one embodiment to the combination device 30. Illustrated here are: a drawing 33 of the combination sheet metal hammer and duct stretcher device 30, a handle 50 of combination sheet metal hammer and duct a stretcher device 30, a top shank 51, an extension and grip 52, a flat 56 of grip 52, a duct stretcher 60, and a wheel 61.

The shank 51 the handle 52, and the head 40 anticipate being manufactured from a durable material with strength and resiliency like metal such as aluminum, alloy steel, brass and like a composite material such as plastic, reinforced plastic, neoprene, urethane and the like. The shank 51 the handle 52 can be two pieces assemble and removably or rigidly connected together. The shank 51 the handle 52 can be a forged, cast or molded material or can be a machined component. Likewise the head 40 can be 2 part unit with the flat end 41 molded or fastened to the body of the head 40.

FIGS. 6 A through 6 D are sketches of installing duct work and using the combination sheet metal hammer and duct stretcher. FIGS. 7 A through 7 C are sketches of installing duct work and using the combination sheet metal hammer and duct stretcher. These drawings are shown in the operation of the combination sheet metal tool and are discussed in the below operations section.

Figure 8:
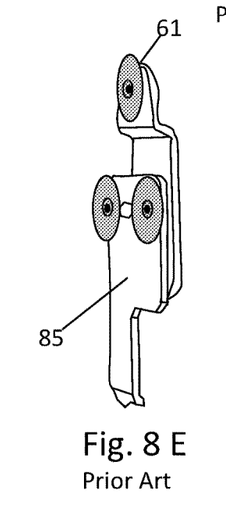

FIGS. 8 A through 8 H are sketches of various conventional sheet metal duct stretchers and tools. Here are indicated a wheel 61 for a duct stretcher, an aperture 62 for a means 63 such as a connecting bolt to shank 51, a means 63 such as a connecting bolt for removably connecting a wheel 51 to the shank 51, typical duct work 70, a sheet metal skilled installer 71, a seam 72, a cleat 74, a duct stretcher 81, an offset duct stretcher 82, and a locking "three" (3) wheeled duct stretcher 85. One notes the non-combination tools are used as follows: use the Duct Stretcher to hold duct in place with one hand while slipping drive cleat in place with other hand. The low profile, straight body is designed to go anywhere, even in the tightest quarters. Additional spacing holes allow wheels to be adjusted to span greater distances. Rugged anodized aluminum body features large vinyl cushion grip and handy hang-up hole. The OFFSET DUCT STRETCHER Same features as a straight duct stretcher plus an offset in the handle to eliminate knuckle contact. The locking duct stretcher pulls duct sections together and holds them in place while freeing both hands to align and install drive cleats. This locks on from either side of duct connection. There is no need to adjust wheels—simply place wheel located on moveable cam to one side of adjoining duct flanges. Then one turns the handle downward to pull duct sections together and lock in place. Greater wheel clearance makes capturing the ends of duct sections, even misshapen flanges, easier than ever. The versatile shape of this frame also lets one hook and pull duct from above as the drive cleat is coaxed along the remainder of flanged track. The durable all steel frame extends beyond wheel edges, making it safe to push, hammer and bend drive cleats as necessary to complete installation. An offset handle design eliminates knuckle contact with work.

Figure 9:
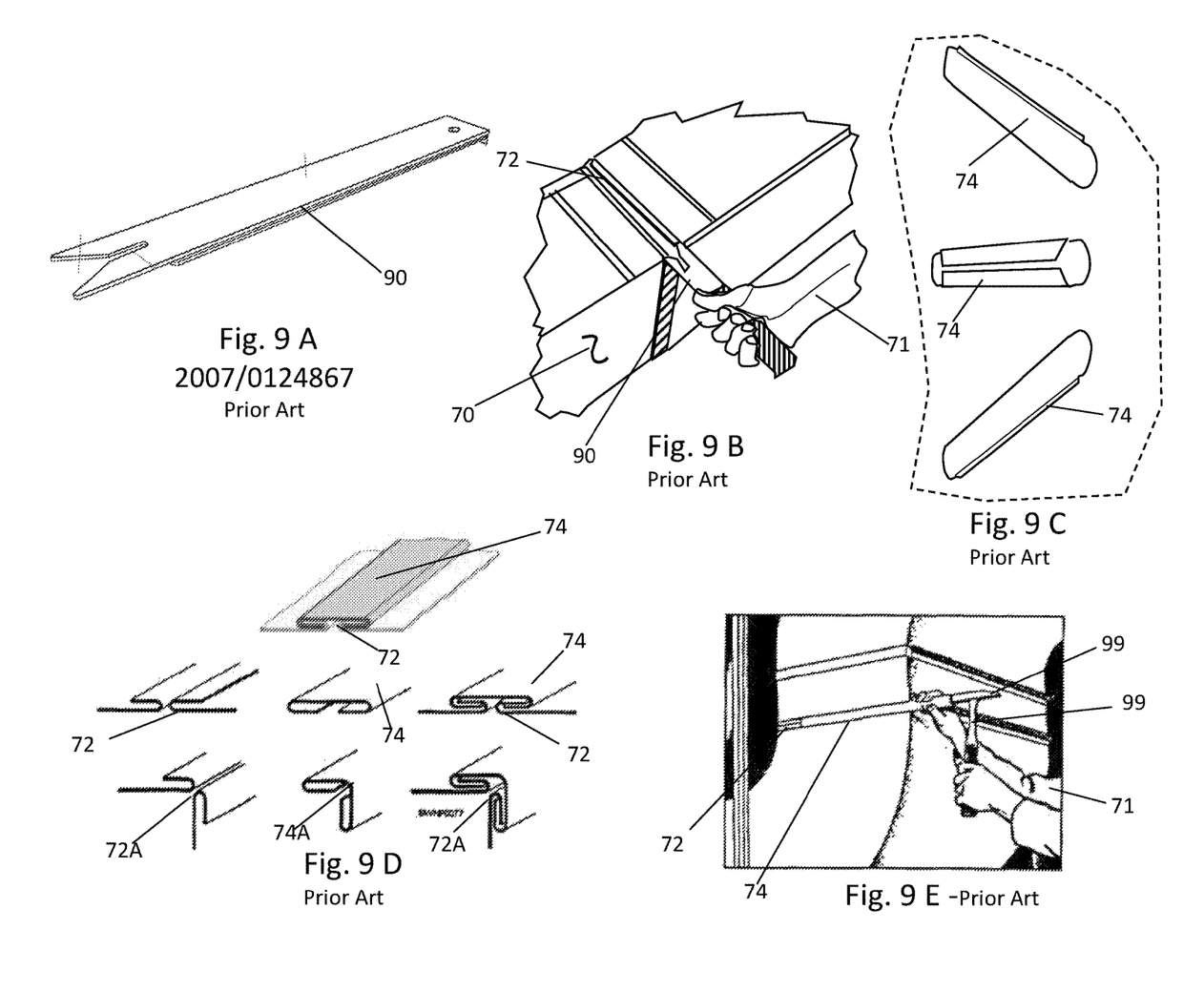

FIGS. 9 A through 9 E are sketches of sheet metal seams, cleats, and seam tools. Here shown are former patents and applications for various prior art. Illustrated are: typical duct work 70, a sheet metal skilled installer 71, a seam 72, a cleat 74, a corner cleat 74A, a sheet metal hammer 99, and a prior art US patent application 2007/0124867 duct assembly tool 90.

Figure 10:
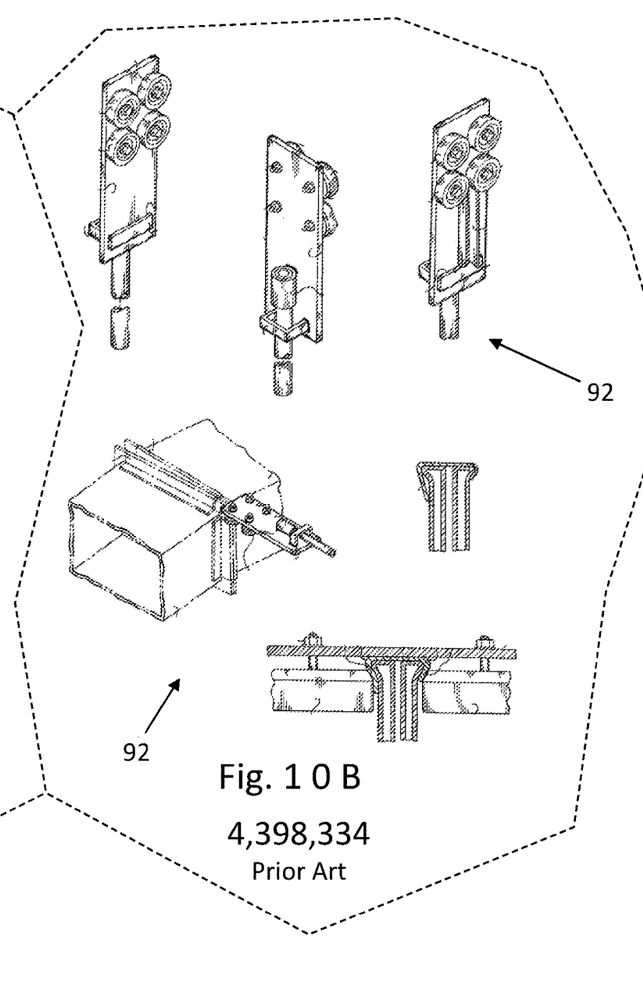

FIGS. 10 A and 10 B are sketches of prior art sheet metal duct tools. Here former patents are provided: a prior art U.S. Pat. No. 8,678,450 rail drive duct connector 91, a prior art U.S. Pat. No. 4,398,334 duct work clip installer and crimper 92.

Figure 11:
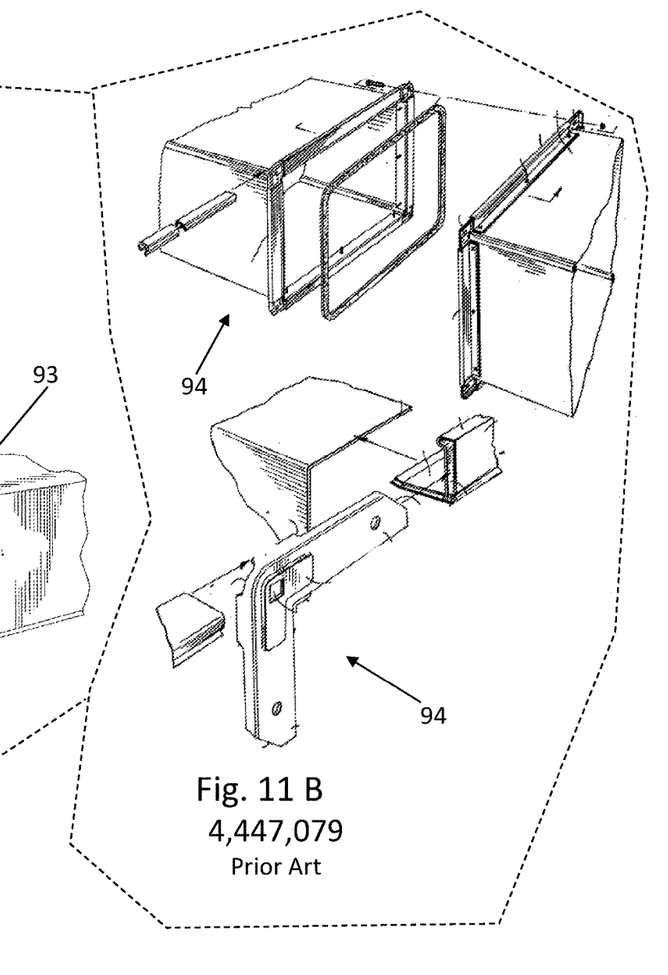

FIGS. 11 A and 11 B are more sketches of prior art sheet metal duct tools. Here other former patents and applications for various sheet metal tools are shown: a prior art U.S. Pat. No. 5,660,069 hands free assembly tool 93 and a prior art U.S. Pat. No. 4,497,079 duct joining system 94. As can be seen, the combination sheet metal hammer and duct stretcher device is a unique combination and use as described herein.

The details mentioned here are exemplary and not limiting. Other specific components and manners specific to describing a combination sheet metal hammer and duct stretcher device 30 may be added as a person having ordinary skill in the field of sheet metal and metal working devices, systems, and their uses well appreciates.

OPERATION OF THE PREFERRED EMBODIMENT

The combination sheet metal hammer and duct stretcher device 30 has been described in the above embodiment. The manner of how the device operates is described here. One notes well that the description above and the operation described here must be taken together to fully illustrate the concept of the combination sheet metal hammer and duct stretcher device 30. The preferred embodiment of a combination sheet metal hammer and duct stretcher device is comprised of: (a) a sheet metal hammer head 40 further comprised of a punch/impact/mallet flat end 41, a pry/lift angled chisel end 42, and a means 43 for securing/connecting head 40 to handle 50—like a threaded aperture and threaded bolt, rivet, cotter pin and key, epoxy, brazing, and soldering or a means 44 for connecting the head 40 to a handle 50; (b) the handle 50 further comprised of a top shank 51; an extension and grip 52, a threaded aperture for the means 44 to connect with the handle 50, and a means 63 such as a connecting bolt for removably connecting a wheel 61 to the shank 51; and (c) a duct stretcher 60 further comprised of the wheel 61, an aperture 62 for the means 63 such as a connecting bolt to attach the wheel 61 to the shank 51 wherein the combination sheet metal hammer and duct stretcher device can be used for sheet metal hammer work and duct stretcher work on new or repaired overhead installation of sheet metal duct devices—registers, diverters, turns, drops as well as heating, cooling, dust, and moisture apparatuses—equally without using another sheet metal tool.

The combination sheet metal hammer and duct stretcher device 30 operates as shown in the sketches of an installer 71. The improvement and problem solved as to the combination sheet metal hammer and duct stretcher device is a fast, secure, and precise way to tighten the duct seam with the duct stretcher wheel, place the cleat over the seam, then drive the cleat onto the seam with the hammer portion of the combination tool. It saves switching tools while up on a ladder and is one less tool to carry in the tool belt. Switching a hand tool can be cumbersome and a misbalance can cause a fall. The ability to have the combination tool relieves these concerns.

FIGS. 6 A through 6 D are sketches of installing duct work 70 and using the combination sheet metal hammer and duct stretcher 30. Here the sheet metal skilled installer 71 uses the duct stretcher 60 to pull the seams 72 together. Then a cleat 74 is started by hand and then the combination tool 30 holds the handle/grip 52 and uses the punch/impact/mallet flat end 41 with a full-polished and beveled face to drive the cleat 74 over the seam 72 and secure the seam. The ductwork 70 hangs from the building structure by means of the duct hangers 73.

FIGS. 7 A through 7 C are sketches of installing duct work 70 and using the combination sheet metal hammer and duct stretcher 30. Here the work is on the ground preparing a duct for installation. In a similar manner, only on the ground/floor, the sheet metal skilled installer 71 uses the duct stretcher 60 to pull the corner seams 72A together. Then a corner cleat 74A is started by hand and then the combination tool 30 holds the handle/grip 52 and uses the punch/impact/mallet flat end 41 with a full-polished and beveled face to drive the corner cleat 74A over the corner seam 72A and secure the seam. The ductwork 70 eventually will be raised and hung from the building structure by means of the duct hangers 73.

Several uses are anticipated for the combination sheet metal hammer and duct stretcher device 30. Some examples, and not limitations, are shown in the following Table.

| ITEM | DESCRIPTION |
| --- | --- |
| 1 | New overhead installation of sheet metal duct devices (registers, diverters, turns, drops as well as heating, cooling, dust, and moisture apparatuses, etc.) |
| 2 | Pre-build or shop build of ductwork |
| 3 | Floor build of fabricated ductwork done on-site |
| 4 | Repair or replacement of overhead sheet metal duct device apparatuses |

With this description it is to be understood that the combination sheet metal hammer and duct stretcher device 30 is not to be limited to only the disclosed embodiment of product. The features of the combination sheet metal tool 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A combination sheet metal hammer and duct stretcher device is comprised of:
   (a) a sheet metal hammer head (40) further comprised of a punch/impact/mallet flat end (41), a pry/lift angled chisel end (42), and a means (43) for securing/connecting head (40) to a handle (50);
   (b) the handle (50) further comprised of a top shank (51); an extension and grip (52), an aperture for the means (43) to connect with the handle (50), and
   (c) a duct stretcher (60) further comprised of a set of two wheels (61), a bolt means (63) for removably connecting each of the two wheels (61) to the top shank (51), and an aperture (62) for each of the bolt means (63) to attach the wheel (61) to the shank (51) whereby the wheels are vertically spaced from each other along the handle and are positioned on the same side of the handle, wherein the combination sheet metal hammer and duct stretcher device can be used for sheet metal hammer work and duct stretcher work on new or repaired overhead installation of sheet metal duct devices—registers, diverters, turns, drops as well as heating, cooling, dust, and moisture apparatuses-equally without using another sheet meta tool.

2. The combination sheet metal hammer and duct stretcher device according to claim 1 wherein the device is further comprising grip (59) made of a resilient yet durable material.

3. The combination sheet metal hammer and duct stretcher device according to claim 2 wherein the resilient yet durable material is selected from a group consisting of synthetic rubber, natural rubber, neoprene, and urethane.

4. The combination sheet metal hammer and duct stretcher device according to claim 1 wherein the means (43) for securing/connecting head (40) to handle (50) is selected from a group consisting of a threaded aperture and threaded bolt, a rivet, a cotter pin and key, an epoxy, a brazing, and a soldering.

5. A combination sheet metal hammer and duct stretcher device is comprised of:
   (a) a sheet metal hammer head (40) further comprised of a punch/impact/mallet flat end (41), a pry/lift angled chisel end (42), and a means (43) for securing/connecting head (40) to handle (50);
   (b) the handle (50) further comprised of:
      (1) a top shank (51) and an extension (52T);
      (2) a bottom shank (52B);
      (3) a means (52S) for securing the top shank (51) and the extension (521) to the bottom shank (528);

(4) an aperture for the means (43) for securing the hammer head (40) to the handle (50); and (c) a duct stretcher (60) further comprised of a set of two wheels (61), a bolt means (63) for removably connecting each of the two wheels (61) to the top shank (51), and an aperture (62) for each of the bolt means (63) to attach the wheel (61) to the shank (51) whereby the wheels are vertically spaced from each other along the handle and are positioned on the same side of the handle, wherein the combination sheet metal hammer and duct stretcher device can be used for sheet metal hammer work and duct stretcher work on new or repaired overhead installation of sheet metal duct devices—registers, diverters, turns, drops as well as heating, cooling, dust, and moisture apparatuses—equally without using another sheet metal tool.

6. The combination sheet metal hammer and duct stretcher device according to claim 5 wherein the means (52S) for securing/connecting the top shank (51) and the extension (52T) to the bottom shank (52B); head (40) to handle (50) is selected from a group consisting of a threaded aperture and threaded bolt, a rivet, a cotter pin and key, an epoxy, a brazing, and a soldering.

7. The combination sheet metal hammer and duct stretcher device according to claim 5 wherein the device is further comprising grip (59) made of a resilient yet durable material.

8. The combination sheet metal hammer and duct stretcher device according to claim 7 wherein the resilient yet durable material is selected from a group consisting of synthetic rubber, natural rubber, neoprene, and urethane.

9. The combination sheet metal hammer and duct stretcher device according to claim 5 wherein the means (43) for securing/connecting head (40) to handle (50) is selected from a group consisting of a threaded aperture and threaded bolt, a rivet, a cotter pin and key, an epoxy, a brazing, and a soldering.

\* \* \* \* \*